United States Patent
Udall et al.

(10) Patent No.: US 9,809,299 B2
(45) Date of Patent: Nov. 7, 2017

(54) PROPELLER BLADE RETENTION

(71) Applicant: ROLLS-ROYCE PLC, London (GB)

(72) Inventors: Kenneth Franklin Udall, Derby (GB); David Michael Beaven, Nottingham (GB); Mark John Houle, Bristol (GB)

(73) Assignee: ROLLS-ROYCE PLC, London (GB)

( * ) Notice: Subject to any disclaimer, the term of this patent is extended or adjusted under 35 U.S.C. 154(b) by 605 days.

(21) Appl. No.: 14/176,646

(22) Filed: Feb. 10, 2014

(65) Prior Publication Data

US 2014/0314577 A1    Oct. 23, 2014

(30) Foreign Application Priority Data

Apr. 22, 2013 (GB) .................................. 1307176.6

(51) Int. Cl.
*B64C 11/04* (2006.01)
*B64C 11/26* (2006.01)

(52) U.S. Cl.
CPC .............. *B64C 11/04* (2013.01); *B64C 11/26* (2013.01)

(58) Field of Classification Search
CPC ....... B64C 11/04; B64C 11/06; B64C 11/065; B64C 11/08; B64C 11/10; B64C 11/12
See application file for complete search history.

(56) References Cited

U.S. PATENT DOCUMENTS

| | | | | |
|---|---|---|---|---|
| 1,400,032 A | * | 12/1921 | Dickey | B64C 11/04 403/257 |
| 1,885,487 A | * | 11/1932 | Squires | B64C 11/065 416/61 |
| 1,951,321 A | * | 3/1934 | Blanchard | B64C 11/06 416/205 |
| 2,017,505 A | * | 10/1935 | Meon | B64C 11/06 416/147 |

(Continued)

FOREIGN PATENT DOCUMENTS

| | | |
|---|---|---|
| GB | 132 321 A | 9/1919 |
| GB | 291 906 A | 6/1928 |

(Continued)

OTHER PUBLICATIONS

Search Report issued in British Application No. GB1307176.6 dated Oct. 3, 2013.

(Continued)

*Primary Examiner* — Christopher M Koehler
(74) *Attorney, Agent, or Firm* — Oliff PLC (57) ABSTRACT

A propeller blade retention arrangement having a propeller blade comprising in radial sequence an aerofoil portion, a shank portion and a root portion. The root portion having first cross-sectional area close to the shank portion and second cross-sectional area at the end distal to the aerofoil portion, wherein the second cross-sectional area is greater than the first cross-sectional area. At least two cheeks each having an inner surface arranged to abut the root portion, an outer surface that is threaded and edge surfaces that abut another of the at least two cheeks; wherein the at least two cheeks are arranged to surround the root portion in circumferential abutment. A collar having a threaded inner surface arranged to threadingly engage the outer surfaces of the at least two cheeks.

24 Claims, 5 Drawing Sheets

(56) References Cited

U.S. PATENT DOCUMENTS

| | | | | |
|---|---|---|---|---|
| 2,344,876 A | * | 3/1944 | Jamison | B64C 11/04 |
| | | | | 416/209 |
| 3,904,301 A | * | 9/1975 | Schroeder | F04D 29/20 |
| | | | | 403/259 |
| 3,914,067 A | * | 10/1975 | Leto | F01D 5/026 |
| | | | | 403/343 |
| 4,407,635 A | | 10/1983 | Grimes et al. | |
| 5,017,092 A | * | 5/1991 | Violette | B64C 11/06 |
| | | | | 416/204 A |
| 2002/0008177 A1 | * | 1/2002 | Violette | B64C 11/04 |
| | | | | 244/123.1 |
| 2010/0104443 A1 | | 4/2010 | Pentony | |
| 2011/0129345 A1 | | 6/2011 | Towkan | |
| 2011/0217172 A1 | * | 9/2011 | Fabre | B64C 11/06 |
| | | | | 416/147 |
| 2014/0356174 A1 | * | 12/2014 | Wang | B64C 39/024 |
| | | | | 416/204 R |

FOREIGN PATENT DOCUMENTS

| | | |
|---|---|---|
| GB | 1 319 235 | 6/1973 |
| GB | 2 244 525 A | 12/1991 |
| GB | 2475719 A | 6/2011 |
| WO | WO 2010/007146 A1 | 1/2010 |

OTHER PUBLICATIONS

Aug. 27, 2014 Search Report issued in European Application No. 14154449.

\* cited by examiner

PROPELLER BLADE RETENTION

The present invention relates to a retention arrangement for a propeller blade. It has particular, but not exclusive, utility for retaining a propeller blade comprising composite material.

A propeller blade generally forms one of an array of such blades mounted to a hub about which they rotate in use. The hub may be aligned with the axis of the engine which drives the rotation or may be offset therefrom using gearboxes or the like. The centrifugal forces generated by rotation of the array of blades try to cause each blade to be expelled radially. To counter this force, a retention arrangement is required to hold the propeller blade in correct relation with the hub. Where the pitch of the propeller blades can be varied, meaning that the propeller blade can be rotated about its own longitudinal axis to change the incident angle the blade portion forms with free-stream airflow, the retention problem is increased since the propeller blades cannot be rigidly mounted to the hub.

US 2011/0129345 and US 2010/104443 teach retaining the root portion of a composite propeller blade in an intermediate material and then a metal collar. The intermediate portion is flared to prevent it from sliding out of the metal collar due to the centrifugal forces. The composite fibres are separated by and bonded to wedges to match the flare of the intermediate portion.

One disadvantage of this arrangement is that the area of radially facing material is relatively small and so the centrifugal load exerted per unit area is large. Another disadvantage is that the separated fibres offer weaknesses from which delaminations can propagate. A further disadvantage is that the shape of the intermediate portion relative to the metal collar gives no mechanical locking for the torque path and instead relies on friction or bonding.

Yet another disadvantage relates to first engine order propeller couples. These result from the once per revolution change in incidence angle, and therefore lift, of the individual propeller blades when the incoming airflow is not aligned with the engine axis. The couples are transferred from the aerofoil into the hub via differential vertical loading of a thrust bearing and differential side loading of the thrust and taper roller bearings. In the known arrangements the thrust bearing is radially outward of the flared part and therefore relatively close to the taper roller bearing so that the bearing side loads are large and the first engine order couples are reduced. This also increases the thrust bearing differential radial loading which consequently increases the risk of high cycle fatigue damage to the hub thrust bearing retaining features.

The present invention provides a propeller blade retention arrangement that seeks to address the aforementioned problems.

Accordingly the present invention provides a propeller blade retention arrangement comprising:
- a propeller blade comprising in radial sequence an aerofoil portion, a shank portion and a root portion; the root portion having first cross-sectional area close to the shank portion and second cross-sectional area at the end distal to the aerofoil portion, wherein the second cross-sectional area is greater than the first cross-sectional area;
- at least two cheeks each having an inner surface arranged to abut the root portion, an outer surface that is threaded and edge surfaces that abut another of the at least two cheeks; wherein the at least two cheeks are arranged to surround the root portion in circumferential abutment; and
- a collar having a threaded inner surface arranged to threadingly engage the outer surfaces of the at least two cheeks.

Advantageously, the present invention provides good retention of the root portion of the propeller blade, reduces the loading by increasing the radial distance of the retention arrangement over which it is spread, and improves the torque transfer capability.

The cheeks may have equal circumferential extent. Advantageously this prevents re-entrant assembly difficulties. The inner surface of each cheek may be arranged to complement the aerofoil portion camber. A first cheek may be arranged to match a pressure side of the aerofoil portion and a second cheek may be arranged to match a suction side of the aerofoil portion. Advantageously the cheeks therefore abut in line with the leading and trailing edges of the aerofoil portion of the propeller blade.

The inner surfaces of the at least two cheeks and the root portion outer surface each comprise complementary interlock features. Advantageously this may improve torque transfer. The complementary interlock features may comprise radial undulations or circumferential undulations.

There may be more than two cheeks. Advantageously this may simplify assembly for some applications.

The edge surfaces of the at least two cheeks may comprise complementary interlock features. Advantageously this may assist assembly by securing, at least temporarily, the cheeks together before the collar is screwed onto the outer surfaces of the cheeks. The complementary interlock features may comprise undulations (radial or axial), or pins and recesses.

The collar may be annular. Advantageously the collar is therefore well adapted for engagement with other components such as bearings and seals. The collar may be coupled to a pitch change mechanism. The outer surface thread direction may be arranged to tighten the collar and cheeks during normal use of the propeller blade. Advantageously this the threads tighten as the centrifugal turning moment tries to change the blade pitch towards fine in normal use.

Each cheek may comprise an integral penny having part-circular outer periphery and an inner periphery arranged to abut the transition from shank portion to aerofoil portion of the propeller blade. Advantageously the integral penny acts as a heat shield to the retention arrangement and root portion, provides a smooth gas-washed surface whatever the blade pitch and may be arranged to preferentially fail to protect trailing blades in the event of propeller blade release.

Each cheek may comprise a flange. The flange may be located intermediate the integral penny and the thread.

The collar may comprise a flange. The cheek flange and the collar flange may be joined together. They may be joined together by any of: bolts, dowels, rivets, adhesive, welds, straking. Advantageously joining the flanges improves the torque transfer.

The first cross-sectional area may have elongated curved periphery. It may be oval or elliptical. Alternatively it may have semi-circular, semi-oval or semi-elliptical ends joined by straight or curved sides. Advantageously the shape of the first cross-sectional area provides good centrifugal turning moment torque transfer from the propeller blade to the cheeks.

The second cross-sectional area may have circular periphery. Advantageously this offers a simple assembly shape.

The root portion may comprise a composite material, which may be fibre-reinforced. The propeller blade may comprise a composite material, which may be fibre-reinforced. The fibres may be different lengths and orientations for different portions of the propeller blade. Advantageously an integrally formed structure is stronger than multiple portions that are separately formed and subsequently joined together.

The collar may comprise metal.

The cheeks may comprise metal, such as titanium or aluminium; metal matrix composite, such as a titanium or aluminium core formed by foaming (including self-skinned) or by additive manufacturing methods (including direct laser deposition); or particulate reinforced metal matrix composite, such as silicon carbide particulate reinforced aluminium metal matrix composite.

The present invention also provides a propeller assembly comprising an array of arrangements as described, an engine comprising one or more such propeller assemblies and a propeller gas turbine engine comprising one or more such propeller assemblies.

Any combination of the optional features is encompassed within the scope of the invention except where mutually exclusive.

The present invention will be more fully described by way of example with reference to the accompanying drawings, in which.

Figure 1:
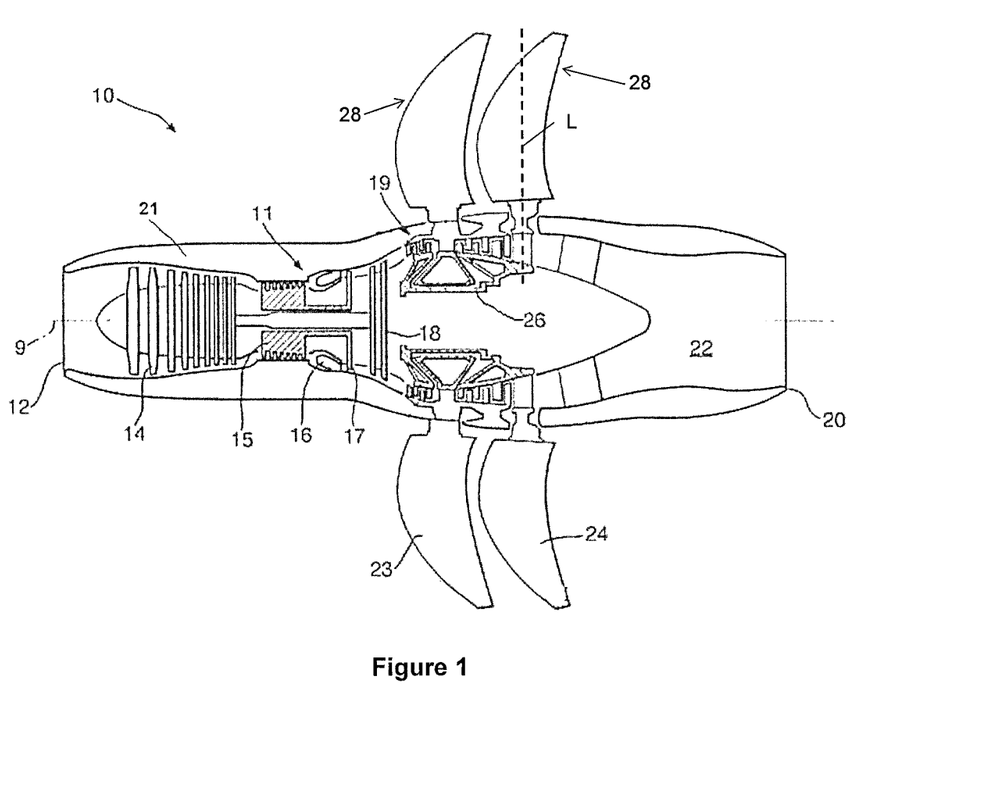
FIG. 1 is a sectional side view of a gas turbine engine having contra-rotating propeller stages.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. The propellers 23, 24 may rotate in opposite senses so that one rotates clockwise and the other anti-clockwise around the engine's rotational axis 9.

The propellers 23, 24 each comprise a hub and a plurality of propeller blades 28 arranged in a regular circumferential array about the hub. Each propeller blade 28 has a longitudinal axis L which coincides with the radial direction of the engine 10 where the hub's rotational axis is coincident with the engine's rotational axis 9. Each propeller blade 28 is arranged to rotate about its longitudinal axis L to change its pitch which is effected by a suitable pitch change mechanism (not shown). Such pitch change may require radially spaced bearing arrangements, for example a roller bearing arrangement and a ball bearing arrangement, to convert linear movement of pitch change rods to rotation of the propeller blade 28 about the longitudinal axis L. This may be achieved by a crank lever (not shown) moving about longitudinal axis L to convert the linear movement of the pitch change rods to the pitch rotation.

Figure 2:
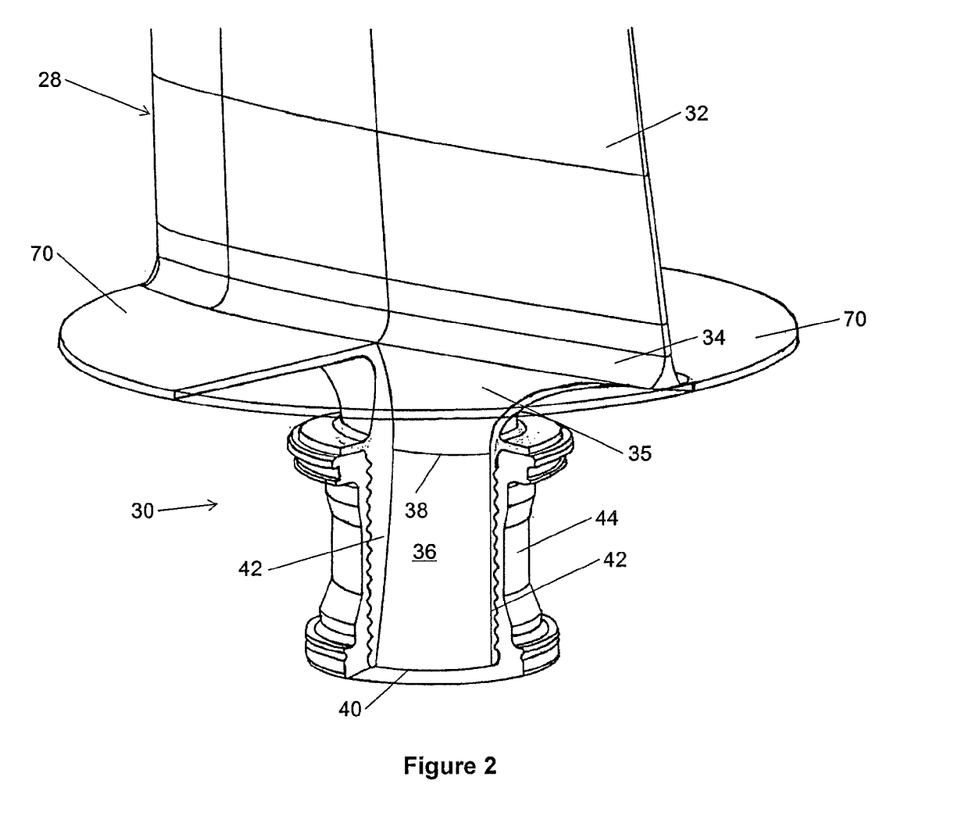
FIG. 2 is a perspective partially cut-away view of the detail of the radially inner end of a propeller blade and retention arrangement according to the present invention.

FIG. 2 illustrates the detail of the radially inner end of a propeller blade 28 and a retention arrangement 30 according to the present invention. The propeller blade 28 comprises an aerofoil portion 32, a root fillet 34, a shank portion 35 and a root portion 36. In a preferred implementation, the propeller blade 28 is formed of composite material. The propeller blade 28 may comprise fibre reinforced composite, with some lengths of fibre approximately aligned with the longitudinal axis L. For example, it may comprise carbon fibres in a thermosetting or thermoplastic polymer matrix. The aerofoil portion 32 may be clad with a metal skin, for example on the leading edge, to protect against erosion. The metal skin may extend to clad the root fillet 34 also or may end before the root fillet 34 to expose an anti-ice heater.

To reduce stresses, the shank portion 35 and root portion 36 preferably have smooth outside surfaces without corners. There is thus a radius or fillet between the root fillet 34 and the shank portion 35 at the leading and trailing edges.

The root portion 36 has varying cross-sectional area, being the area perpendicular to the longitudinal axis L. The first cross-sectional area 38 is located where the shank portion 35 blends into the root portion 36. In some embodiments it has an oval or elliptical periphery. In other embodiments it may have peripheral shape formed by the intersection of two semi-circular or elliptical ends with straight sides. The sides may be curved with a large radius of curvature.

Figure 3:
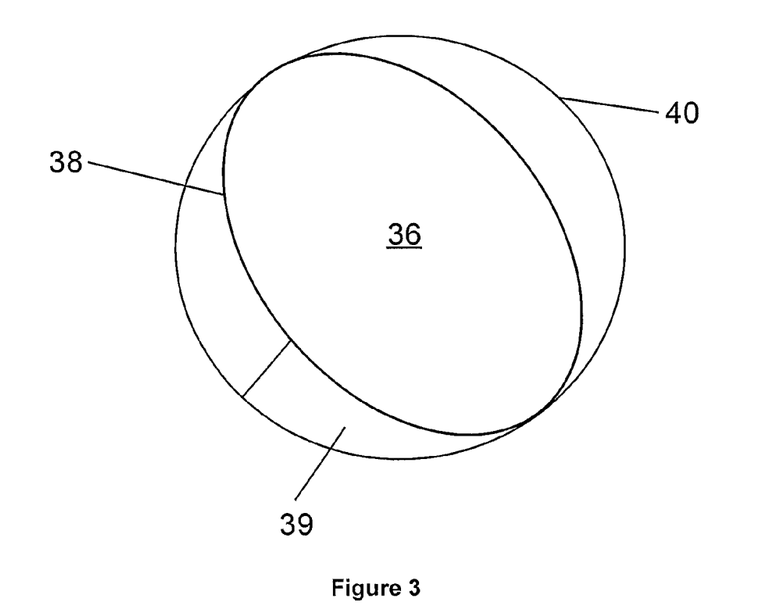
FIG. 3 is a schematic radial view of the root portion of a propeller blade.

The second cross-sectional area 40 is located at the radially inner end of the root portion 36. In preferred embodiments it has circular periphery. The second cross-sectional area 40 is greater than the first cross-sectional area 38 so that the root portion 36 flares smoothly between them. FIG. 3 illustrates a view radially inwardly of the root portion 36. It can be seen that the first cross-sectional area 38 circumscribes an area within the second cross-sectional area 40. The area indicated by reference numeral 39 corresponds to the cutaway section in FIG. 2.

Returning to FIG. 2 the blade retention arrangement 30 comprises two cheeks 42 and a collar 44. The cheeks 42 are described with reference to FIG. 4 in which one of the cheeks 42 is shown. In a preferred embodiment there are two cheeks 42, to facilitate assembly of the retention arrangement 30, each of which is based on a semi-annular shape thereby having equal circumferential extent. The cheek 42 comprises a smooth inner surface 46 and a threaded outer surface 48. Preferably the threaded outer surface 48 is rolled or otherwise treated for good fatigue strength.

Figure 4:
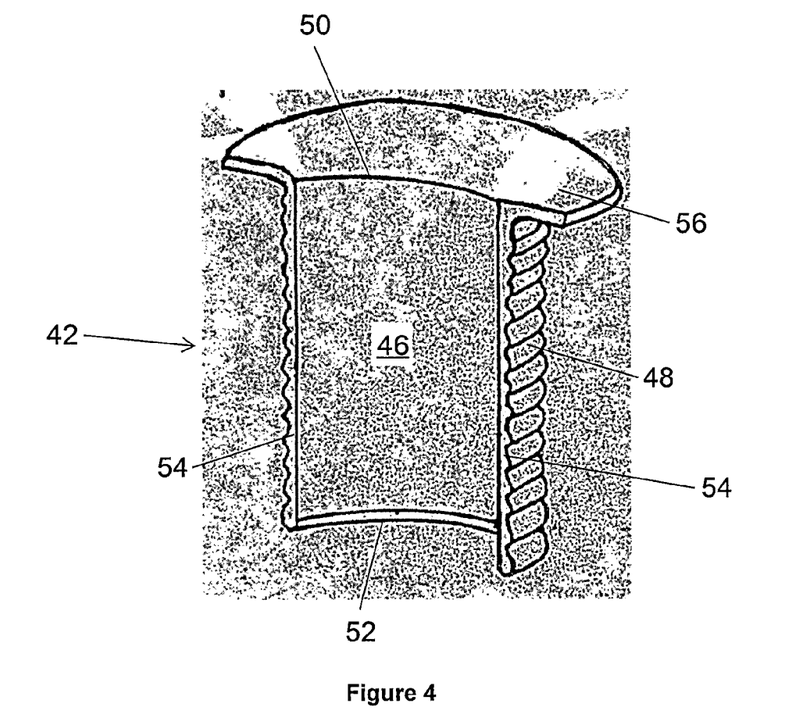
FIG. 4 is a perspective view of a cheek according to the present invention.

The inner surface 46 flares from semi-elliptical or semi-oval at its upper edge 50, to match the periphery of the root portion 36 at the first cross-sectional area 38, to semi-circular at its lower edge 52, to match the periphery of the root portion 36 at the second cross-sectional area 40. Thus the circumferential length at the lower edge 52 is greater than the circumferential length at the upper edge 50. The inner surface 46 of the cheek 42 is arranged to snugly enclose part of the root portion 36 of the propeller blade 28. It will be understood therefore that the upper edge 50, lower edge 52 and profile of the inner surface 46 therebetween will be shaped to match the outer surface of the root portion 36.

The cheek 42 comprises edge surfaces 54 that define the circumferential extent of the cheek 42. In the preferred embodiment the edge surfaces 54 are planar. Two cheeks 42 are fitted together with their edge surfaces 54 abutting to form an annular arrangement. In alternative embodiments, the edge surfaces 54 of two cheeks 42 may comprise complementary interlock features. Such features may be undulations (radial or axial), pins and recesses, or other arrangements known to the skilled reader.

The outer surface 48 of the cheek 42 is threaded and semi-annular; that is, it has constant diameter at all radial positions. When two cheeks 42 are fitted together the outer surfaces 48 form a continuous thread around the annular periphery. It will be apparent that the two cheeks 42 are not identical since the threads on the outer surfaces 48 would not match in this case. Additionally, each cheek 42 matches to a different part of the root portion 36 of the propeller blade 28; for example one cheek 42 matches to the shaping due to the leading edge and a second cheek 42 matches to the shaping at the trailing edge of the blade.

In a preferred embodiment the cheeks 42 are arranged so that their edge surfaces 54 abut at the major axis of the first cross-sectional area 38 of the root portion 36 of the propeller blade 28. This means that one cheek 42 is aligned with the pressure side of the aerofoil portion 32 and the other cheek 42 is aligned with the suction side of the aerofoil portion 32. Alternatively, the edge surfaces 54 may abut at the minor axis of the first cross-sectional area 38 or at any intermediate positions between the major and minor axes of the first cross-sectional area 38. Preferably the two cheeks 42 have equal circumferential extent to avoid the complexities associated with re-entrant assembly. Alternatively, they may have different circumferential extent so that one pair of edge surfaces 54 abut at one of the axes of the first cross-sectional area 38 and the other pair of edge surfaces 54 abut at the other of the axes or away from both axes. In this case the larger cheek 42 may be split to enable simple assembly. Other variations of the abutment positions of the edge surfaces 54 will be apparent to the skilled reader.

Optionally, the cheek 42 also comprises a flange 56 aligned with the upper edge 50. The flange 56 extends outwardly from the outer surface 48 of the cheek 42.

Figure 5:
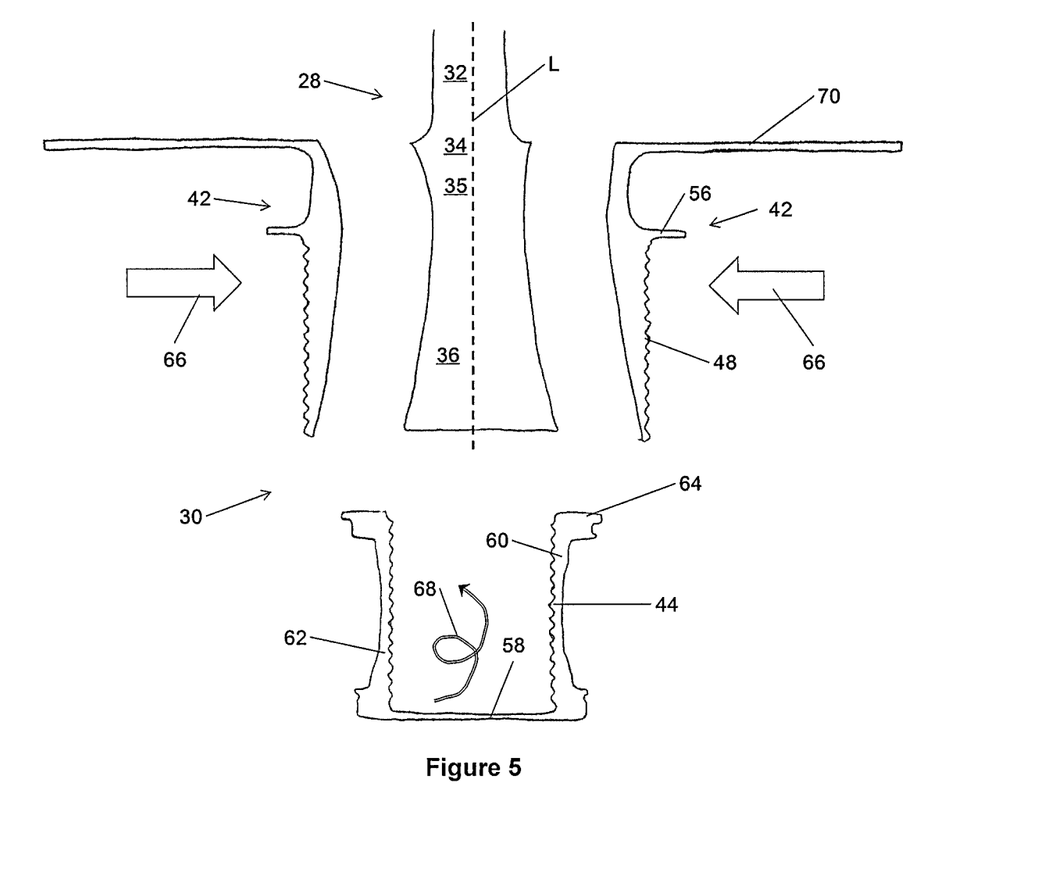
FIG. 5 is an exploded sectional view of a propeller blade and retention arrangement according to the present invention.

FIG. 5 is an exploded view of part of the propeller blade 28 and of the retention arrangement 30. The collar 44 is annular with one closed end 58 which forms the radially innermost part of the retention arrangement 30 when fully assembled. The inner surface 60 of the collar 44 is threaded and has constant diameter. The outer surface 62 may have any desired profile. For example it may be knurled or finned for grip and grease stirring; or include one or more annular bearing race or have shaping to enable connection to other components such as bearing races, seals and bearing failure catcher features. The closed end 58 may include features to connect to a pitch change mechanism. Optionally the collar 44 comprises an annular flange 64 extending outwardly from the outer surface 62 at the opposite end to the closed end 58.

The retention arrangement 30 is assembled with the propeller blade 28 in a number of steps. First the two cheeks 42 are pushed towards the root portion 36 of the propeller blade 28 in a direction that is approximately perpendicular to the longitudinal axis L of the propeller blade 28. This is shown by arrows 66. The cheeks 42 are pushed in the direction of arrows 66 until they fit snugly together around the root portion 36 and their edge surfaces 54 abut.

In a second step the collar 44 is screwed onto the outside of the cheeks 42 so that the threads of the inner surface 60 of the collar 44 engage the threads of the outer surfaces 48 of the cheeks 42. This is shown by pigtail arrow 68. The collar 44 is screwed until the closed end 58 abuts the lower edge 52 of the cheeks 42. The threads may be either handed. However, where the collar 44 is coupled to a pitch change mechanism it is preferable that the threads are so handed as to tighten under the centrifugal turning moment, that is the tendency of the propeller blade 28 to rotate about its longitudinal axis L towards fine pitch, during normal use of the propeller blade 28. The non-circular shape of the first cross-sectional area 38 provides efficient centrifugal turning moment torque transfer from the propeller blade 28 to the cheeks 42.

Where the cheeks 42 and the collar 44 comprise the optional flanges 56, 64, the collar 44 is screwed onto the outside of the cheeks 42 until the collar flange 64 abuts the cheeks flanges 56. Preferably this is before the closed end 58 of the collar 44 abuts the lower edge 52 of the cheeks 42 to avoid tolerance problems.

Figure 6:
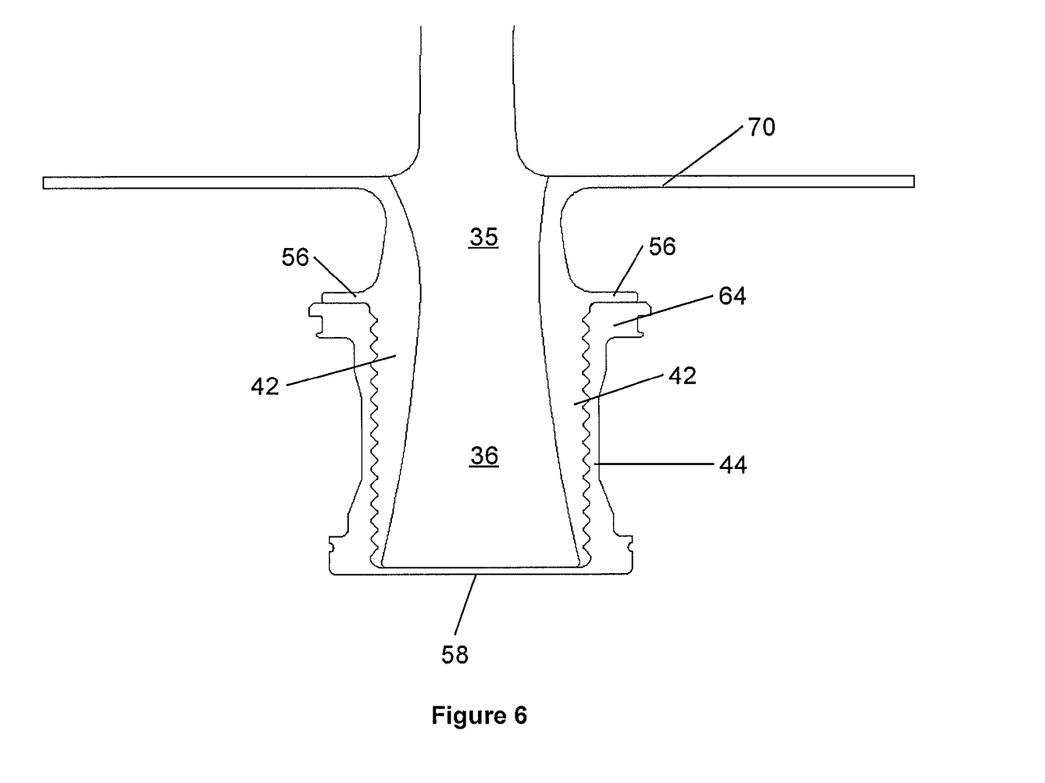
FIG. 6 is a sectional view of a propeller blade and retention arrangement according to the present invention.

The assembled arrangement can be seen in FIG. 6. Preferably the collar flange 64 is affixed to each cheek flange 56 by adhesive, one or more bolts with optional shear dowels, one or more rivets, welding, straking or any other method understood by the skilled reader. Where the flanges 56, 64 are joined by one or more bolts disassembly is quick and easy when required for inspection, maintenance or other reasons. Apertures in the flange 64 for the bolts may be blind and tapped to avoid creating a grease leakage path from the bearing chamber. The flanges 56, 64 give efficient centrifugal turning moment torque transfer from the cheeks 42 to the collar 44.

As can be seen in FIG. 2, FIG. 5 and FIG. 6, the cheeks 42 have greater radial extent than the collar 44. Thus the cheeks 42 extend radially for the full longitudinal height of the shank portion 35 of the propeller blade 28. The cheeks 42 each comprise part of an integral penny 70. Where the cheeks 42 have equal circumferential extent, each cheek 42 comprises half of the integral penny 70. The integral penny 70 resembles a flange with circular periphery. It has an aperture about the axis of symmetry which is shaped to receive the root fillet 34 of the propeller blade 28. The integral penny 70 acts to seal against a surrounding casing component whatever pitch the propeller blade 28 is angled at. The diameter of the integral penny 70 may be equal to or greater than the chord length of the aerofoil portion 32 of the propeller blade 28. Preferably the root fillet 34 of the propeller blade 28 forms a smooth gas-washed surface with the integral penny 70. The inner surfaces 46 of the cheeks 42 preferably match the shape of the shank portion 35 of the propeller blade 28 between the optional flange 56 and the integral penny 70.

The transitions between the main body of the cheek 42, the flange 56 and the integral penny 70 and between the outer surface 62 of the collar 44 and the flange 64 may each comprise a blend fillet or radius to reduce mechanical stresses.

Advantageously, the retention arrangement 30 of the present invention is easily assembled but forms a sturdy arrangement once assembled. The inner surfaces 46 of the cheeks 42 take the centrifugal loads from the root portion 36 of the propeller blade 28 over a greater projected radially facing area than in the known arrangements so that the load per unit area is reduced. Therefore, thinner and lighter cheeks 42 can be used or a larger root load safety factor achieved for the same size cheeks 42. Advantageously blade pitch torque is transmitted from the closed end 58 of the collar 44, through the cheeks 42 and into the propeller blade 28 via the torque capability of the oval or elliptical first cross-sectional area 38 of the root portion 36.

In an alternative embodiment the threaded inner surface 60 of the collar 44 and the threaded outer surfaces 48 of the cheeks 42 may be tapered such that the radially outer end of the thread, nearer optional flanges 64, 56, has a larger diameter than the radially inner end of the thread, nearer the closed end 58. This pre-compresses the joint between the threads. Alternatively pre-compression of the joint between the threads can be achieved by providing an entry 'lead' on the thread. Preferably the threaded outer surfaces 48 of the cheeks 42 and the threaded inner surface 60 of the collar 44 are rolled or otherwise treated to provide good fatigue strength.

By having two (or more) cheeks 42 it is simple to account for blade camber in the shaping of the inner surface 46 because each cheek 42 can have a different shape inner surface 46. The cheeks 42 need not comprise the same material as the root portion 36 of the propeller blade 28. Advantageously, the cheeks 42 may comprise a material that is optimised for its purposes. For example, the cheeks 42 may comprise metal, such as titanium or aluminium, to offer adequate thread shear strength, compressive strength and thermal conductivity. Alternatively, the cheeks 42 may comprise metal matrix composite, for example fine silicon carbide particulate reinforced aluminium metal matrix composite, to offer high stiffness combined with low weight and density, thermal expansion that is compatible with the composite root portion 36, and suitable machinability.

The retention arrangement 30 of the present invention has good shear load transfer from the cheeks 42 into the collar 44 via the threads. The outward forces acting on the cheeks 42 are opposed by hoop stresses in the annular collar 44.

The invention results in greater separation of the bearings on the outer surface 62 of the collar 44 for a given root depth because the flare between the first and second cross-sectional areas 38, 40 that retains the root portion 36 is within the bearing span and not radially inside it. Beneficially this means that more first engine order propeller couple is taken in differential side loading of the bearings instead of differential vertical loading which results in improved bearing life. Also the hub life is improved because there are lower vibratory stresses in the radial retention features for the ball bearing.

Advantageously the optional radial extension of the cheeks 42 support the shank portion 35 of the propeller blade 28 against torsion and bending in the event of foreign object damage or other impacts on the propeller blade 28. This minimises energy release by causing preferential failure of the propeller blade 28 above the annulus.

The optional radial extension to the cheeks 42 and integral penny 70 also protects the retention arrangement 30 and the shank portion 35 of the propeller blade 28 from excessive heat and impact damage. The integral penny 70 acts as a heat dump to the free-stream air.

Although the root portion 36 and inner surfaces 46 of the cheeks 42 have been described as smooth they may alternatively comprise complementary interlock features. For example, they may comprise complementary radial undulations, circumferential undulations or a combination of both. Advantageously, such features improve the shear load transfer across this interface, although they complicate the blade root fibre load paths.

Trim balance weights may be added to the cheek flange 56 to balance the propeller assembly. For example, balance weights may be located under bolt heads where such are used to join the collar flange 64 to the cheek flanges 56.

Where counterweights are required, where a pitch lock system is not used, mid-chord locations on the integral penny 70 can be used for paired balanced counterweights. Since the cheeks 42 are relatively thick in radial alignment with these locations there are good load paths to the pitch bearings. These load paths are also amenable to improvement. For example buttresses can be added to the radially inner surface of the integral penny 70 from the radial extension of the cheeks 42 that match the shank portion 35 of the propeller blade 28 or from the optional flange 56. Alternatively the cheeks 42 can be formed with internal cavities to enhance bending stiffness and strength whilst reducing weight.

Although two cheeks 42 have been described, more than two cheeks 42 can be provided that abut to form an arrangement having a threaded annular outer surface and a smooth flared inner surface. The cheeks 42 may be held together independently of the collar 44 by welding, brazing, bonding, bolts, rivets, complementary interlock features or any other method known to the skilled man.

Although a 'pusher' propeller gas turbine engine 10 has been described with respect to FIG. 1, the present invention is equally applicable to a 'puller' arrangement in which the propeller(s) is situated at the axially forward part of the engine 10. The invention is also applicable with felicity to a turboprop engine, a geared turbofan engine, a marine or industrial gas turbine engine 10, a wind turbine or a tidal turbine. When used for tidal turbines the propeller blade 28 and retention arrangement 30 components are likely to comprise a metal such as nickel aluminium bronze.

Advantageously the present invention enables the propeller blade 28 to be formed as an integral shape in composite material rather than comprising separate portions that are later joined. For example, the propeller blade 28 may be formed by 3D weaving, by the progressive additional of radial (warp) and transverse (weft) tows, or by the progressive thickening of weft tows towards the base of the propeller blade 28.

Advantageously, using bolts to secure the optional flanges 56, 64 together obviates heat damage to the composite propeller blade 28 during manufacture and assembly of the retention arrangement 30. Furthermore, bolted assembly allows more efficient maintenance activity as only those components that need inspection, repair or replacement need to be removed.

The propeller blade retention arrangement of the present invention may comprise integral seals. These can be located to prevent water ingress, for example from rain ingress into the gas turbine engine 10, and thus reduce the possibility of damage caused by expansion of water on freezing.

The integral penny 70 may be hollow to reduce weight whilst improving centrifugal load stiffness and strength. In particular, if a propeller blade 28 were to be released due to bearing failure, the subsequent impact of the trailing blade on the edge of the released integral penny 70 would preferentially cause energy absorption and failure of the integral penny 70 thus protecting the integrity of the trailing blade. Alternatively the integral penny 70 may comprise interlocking with the aperture in the fairing in which it is located in use so that the integral penny 70 acts as a secondary catcher mechanism in the event of bearing failure causing a blade to be released. The integral penny 70 can be appropriately strengthened for this task.

The threaded outer surfaces 48 of the cheeks 42 and the threaded inner surface 60 of the collar 44 may alternatively be replaced by enlarging or otherwise strengthening the collar flange 64 and cheek flanges 56. The connection mechanism, for example bolts, between the flanges 56, 64 should be commensurately strengthened.

The invention claimed is:

1. A propeller blade retention arrangement comprising:
   a propeller blade comprising in radial sequence an aerofoil portion, a shank portion and a root portion; the root portion having first cross-sectional area close to the shank portion and second cross-sectional area at the end distal to the aerofoil portion, wherein the second cross-sectional area is greater than the first cross-sectional area;
   at least two cheeks each having an inner surface arranged to abut the root portion, an outer surface that is threaded, a cheek flange that extends outwardly from the outer surface, and edge surfaces that abut another of the at least two cheeks; wherein the at least two cheeks are arranged to surround the root portion in circumferential abutment, and each cheek comprises part of an integral penny having part-circular outer periphery and an inner periphery arranged to abut the transition from shank portion to aerofoil portion of the propeller blade; and
   a collar having an annular flange and a threaded inner surface, the collar being arranged so that the threaded inner surface threadingly engages the outer surfaces of the at least two cheeks, wherein the collar has a lesser radial extent than each cheek, each cheek flange is arranged outside of the collar, the annular flange extends away from the propeller blade in the axial direction, and the annular flange abuts each cheek flange.

2. The arrangement as claimed in claim 1 wherein the cheeks have equal circumferential extent.

3. The arrangement as claimed in claim 1 wherein the inner surface of each cheek is arranged to complement the aerofoil portion camber.

4. The arrangement as claimed in claim 3 wherein a first cheek is arranged to match a pressure side of the aerofoil portion and a second cheek is arranged to match a suction side of the aerofoil portion.

5. The arrangement as claimed in claim 1 wherein the inner surfaces of the at least two cheeks and the root portion outer surface each comprise complementary interlock features, and the complementary interlock features comprise radial undulations or circumferential undulations.

6. The arrangement as claimed in claim 1 wherein the edge surfaces of the at least two cheeks comprise complementary interlock features.

7. The arrangement as claimed in claim 6 wherein the complementary interlock features comprise undulations, or pins and recesses.

8. The arrangement as claimed in claim 1 wherein the collar is annular.

9. The arrangement as claimed in claim 1 wherein the collar is coupled to a pitch change mechanism.

10. The arrangement as claimed in claim 9 wherein the outer surface thread direction is arranged to tighten the collar and cheeks during normal use of the propeller blade.

11. The arrangement as claimed in claim 1 wherein each cheek flange is located intermediate the integral penny and the thread.

12. The arrangement as claimed in claim 11 wherein each cheek flange is joined to the annular flange by any of bolts, dowels, rivets, adhesive, welds, or straking.

13. The arrangement as claimed in claim 1 wherein the first cross-sectional area has elongated curved periphery and/or the second cross-sectional area has circular periphery.

14. The arrangement as claimed in claim 1 wherein the root portion comprises composite material.

15. The arrangement as claimed in claim 1 wherein the collar comprises metal.

16. The arrangement as claimed in claim 1 wherein the cheeks comprise: metal; metal matrix composite; or particulate reinforced metal matrix composite.

17. A propeller assembly comprising an array of the arrangements as claimed in claim 1.

18. An engine comprising the propeller assembly as claimed in claim 17.

19. A propeller gas turbine engine comprising the propeller assembly as claimed in claim 17.

20. The arrangement as claimed in claim 1 wherein each cheek is a one-piece component.

21. The arrangement as claimed in claim 1 wherein the collar is one-piece and annular with one closed end.

22. The arrangement as claimed in claim 1 wherein the cheek flanges are affixed to the annular flange.

23. A propeller blade retention arrangement comprising:
   a propeller blade comprising in radial sequence an aerofoil portion, a shank portion and a root portion; the root portion having first cross-sectional area close to the shank portion and second cross-sectional area at the end distal to the aerofoil portion, wherein the second cross-sectional area is greater than the first cross-sectional area;
   at least two cheeks each being a one-piece component that has an inner surface arranged to abut the root portion, an outer surface that is threaded, a cheek flange that extends outwardly from the outer surface, and edge surfaces that abut another of the at least two cheeks; wherein the at least two cheeks are arranged to surround the root portion in circumferential abutment, and each cheek comprises part of an integral penny having part-circular outer periphery and an inner periphery arranged to abut the transition from shank portion to aerofoil portion of the propeller blade; and
   a collar having an annular flange and a threaded inner surface, the collar being arranged so that the threaded inner surface threadingly engages the outer surfaces of the at least two cheeks, wherein the integral penny extends outside of the collar, each cheek flange is arranged outside of the collar, the annular flange extends away from the propeller blade in the axial direction, and the annular flange abuts each cheek flange.

24. A propeller blade retention arrangement comprising:
   a propeller blade comprising in radial sequence an aerofoil portion, a shank portion and a root portion; the root portion having first cross-sectional area close to the shank portion and second cross-sectional area at the end distal to the aerofoil portion, wherein the second cross-sectional area is greater than the first cross-sectional area;

at least two cheeks each having an inner surface arranged to abut the root portion, an outer surface that is threaded, a cheek flange that extends outwardly from the outer surface, and edge surfaces that abut another of the at least two cheeks; wherein the at least two cheeks are arranged to surround the root portion in circumferential abutment, and each cheek comprises part of an integral penny having part-circular outer periphery and an inner periphery arranged to abut the transition from shank portion to aerofoil portion of the propeller blade; and a collar having an annular flange and a threaded inner surface, the collar being arranged so that the threaded inner surface threadingly engages the outer surfaces of the at least two cheeks, wherein each cheek longitudinally extends towards the aerofoil portion past the collar, each cheek flange is arranged outside of the collar, the annular flange extends away from the propeller blade in the axial direction, and the annular flange abuts each cheek flange.

* * * * *